Dec. 3, 1929.  A. TAMMEO  1,738,463
WING STRUCTURE VARYING DEVICE FOR AEROPLANES
Filed July 25, 1928   5 Sheets-Sheet 1

INVENTOR
Aldo Tammeo
BY
ATTORNEY

INVENTOR
Aldo Tammeo
BY
ATTORNEY

Dec. 3, 1929.   A. TAMMEO   1,738,463
WING STRUCTURE VARYING DEVICE FOR AEROPLANES
Filed July 25, 1928   5 Sheets-Sheet 3

INVENTOR
Aldo Tammeo
BY
ATTORNEY

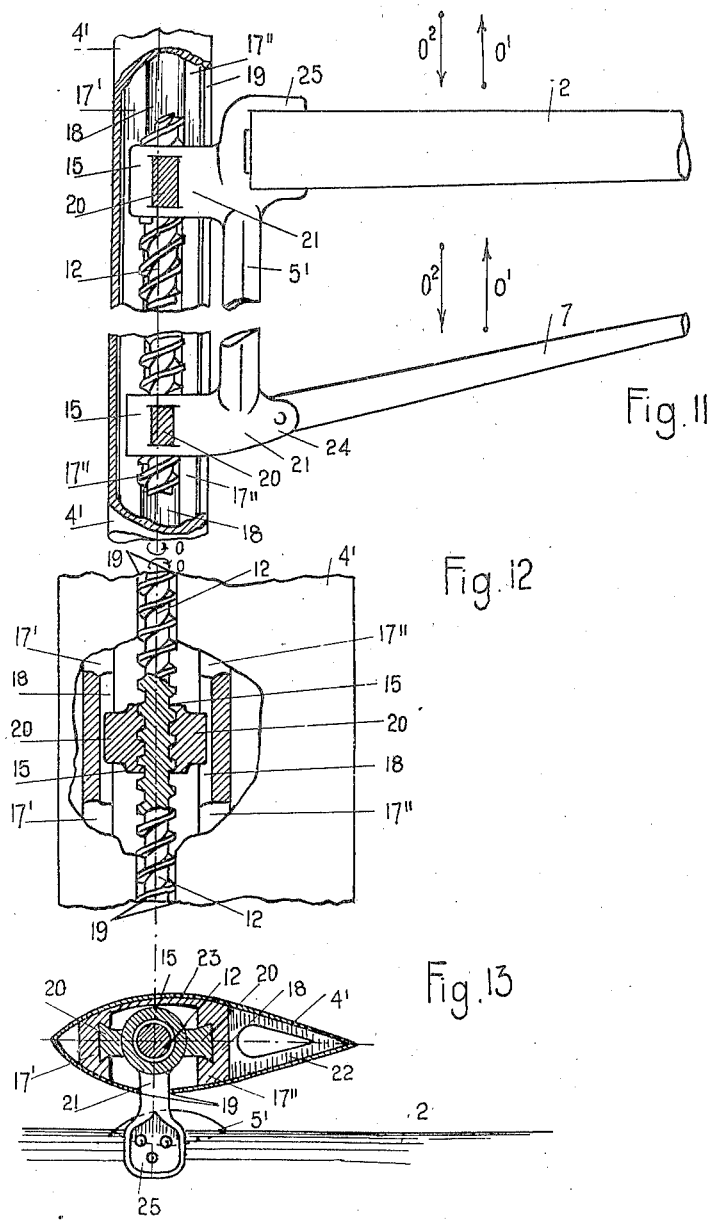

Patented Dec. 3, 1929

1,738,463

UNITED STATES PATENT OFFICE

ALDO TAMMEO, OF GENOA, ITALY, ASSIGNOR OF ONE-HALF TO EUGENIO CAMINADA, OF GENOA, ITALY

WING-STRUCTURE-VARYING DEVICE FOR AEROPLANES

Application filed July 25, 1928, Serial No. 295,148, and in Italy July 29, 1927.

This invention relates to aeroplanes, and has for its object to provide a device which will be adapted to control the variation of the wing structure and the profile of the wing or wings of an aeroplane, in order to promptly change, even during the flight and at the pilot's will, a monoplane or biplane into a biplane or triplane, respectively, or vice versa, for the purpose of varying, according to the requirements, the amplitude of the lifting surface, the curvature of profile of the wing or wings, and/or the mean resultant incidence of the wings of the machine in relation to the line of flight.

The device according to the invention applies to the aeroplanes in which the change in surface, curvature of profile, and/or the mean resultant incidence is carried out by separating in a vertical sense the main wings of a machine in two or three complemental portions or profiles, and by imparting to one separate portion, or to the separate portions, of the wings a variation of incidence.

According to the present invention, the movable or detachable portions of the wings are operated by means of triangular rigid frames, one side of which consists of a vertically slidable stay, while the other sides are substantially common members of the cellule of the machine.

The invention will now be described with reference to the acompanying drawings, showing by way of example some embodiments thereof as applied to the transformation of a monoplane into a biplane. In the drawings:

Fig. 11 is a part sectional front view, Fig. 12 a part sectional side view with certain parts broken away, and Fig. 13 a sectional plane view, of a detail.

Figure 1:
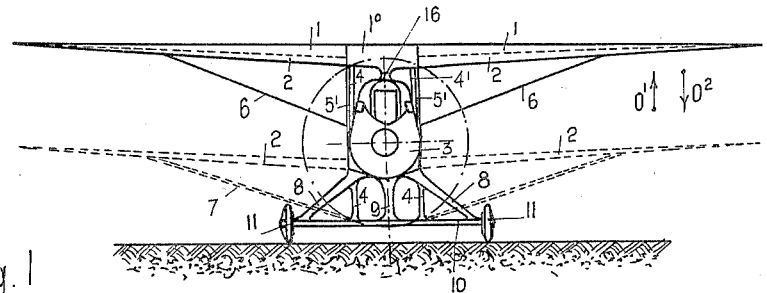
Fig. 1 is a diagrammatic front view of an aeroplane embodying the device according to the invention, in the monoplane formation thereof.

The aeroplane shown as an embodiment of the invention comprises a central fuselage 3, a pair of main rigid top wings 1, 1, the intermediate portion 1° of which is fixedly connected to the fuselage by means of the fin shaped central member 16, oblique struts 6 extending in pairs from the sides of the fuselage to the top wings, and a landing gear consisting of oblique members 8, 8, and a horizontal intermediate beam 10 connected to the fuselage by a bracket 9 and carrying wheels 11.

Figure 2:
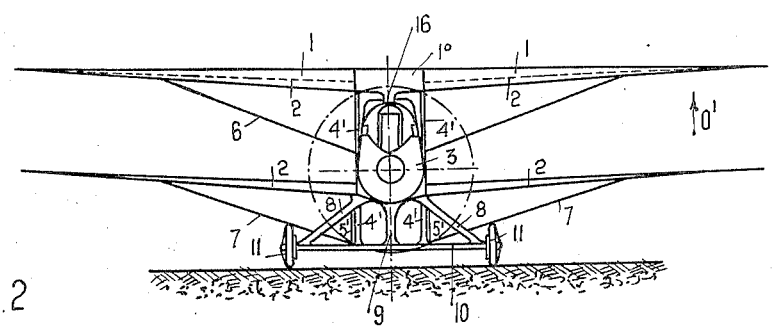
Fig. 2 is a similar view of the same in its biplane formation.
Figure 3:
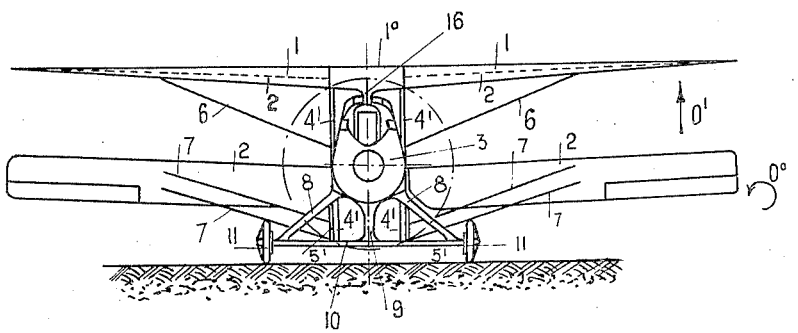
Fig. 3 shows a biplane like that of Fig. 2, a variation of incidence being imparted to the movable portion of the wings thereof.

From the underside of each of the top wings 1, 1, a wing 2 having lesser thickness and chord may be detached and vertically displaced, at the pilot's will, down to the position shown in Fig. 2.

Figure 4:
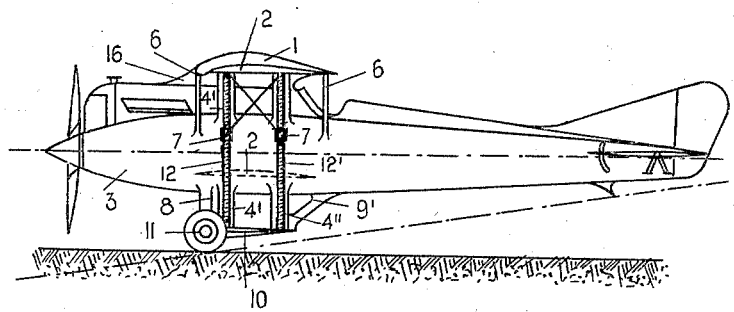
Figs. 4, 5 and 6 are side views of the aeroplanes shown in Figs. 1, 2 and 3 respectively.
Figure 5:
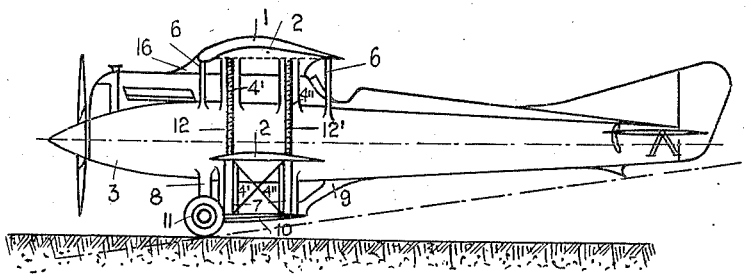

As shown in Figs. 4 and 5, the vertical displacements of the wings 2 will take place within the room defined by the cross planes containing the oblique side struts 6.

According to one embodiment of the invention, particularly shown in Figs. 4, 5, 7 and 8, each movable wing 2 is provided with inner cross frame members or longérons (diagrammatically shown by dotted lines at 14, 14' and of any suitable construction) connected to slidable vertical bars 5' and 5'', and to oblique struts 7', 7'', respectively; said members 5' and 7', 5'' and 7'', forming V-shaped frames contained in parallel transverse planes.

The upper ends of the struts 5', 7', 5'' and 7'' are suitably jointed with the longérons 14, 14' in the movable wing 2, so that each triangular frame consisting of elements 5', 14, 7' and 5'', 14', 7'' respectively, will form a rigid unit, and be rigidly connected to the movable wing. Said units are intimately connected to each other by a pair of diagonal wires 24, strengthening the oblique struts 7', 7″. The said rigid triangular frames are adapted to be vertically and conformably displaced, so as to impart parallel up and down displacements to the movable wing 2.

Such operation is obtained by means of threaded rings or collars 15, integral with the struts 5′, 5″ at both ends thereof, said collars engaging parallel worms 12, 12′, which are capable of being rapidly rotated.

The worms 12, 12′, are enclosed in vertical bushings 4′, 4″, preferably having a nearly elliptical section, as shown in Fig. 13, and rigidly connecting the fuselage with the upper stationary wing 1 and the axle plane 10 of the landing gear.

On rotating the worms 12, 12′, about their axes, the collars 15 are caused to slide vertically within the bushings 4′, 4″, and thereby to impart a translation to the triangular frames and the movable wing connected therewith.

The above described arrangement is adapted to provide for the separation and parallel displacements of the movable wing only, while keeping constant the own incidence thereof.

Figure 9:
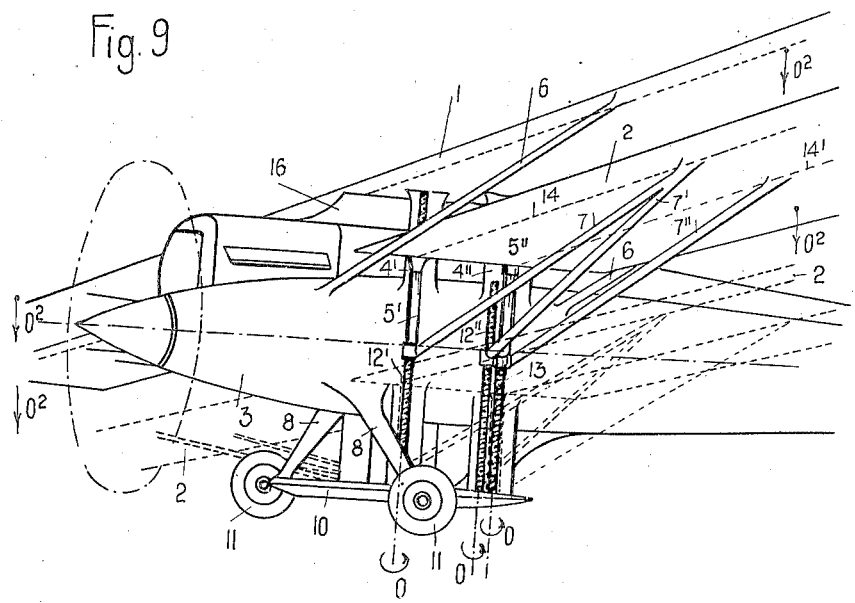
Figs. 9 and 10 are similar views of an alternative in two operative positions.
Figure 10:
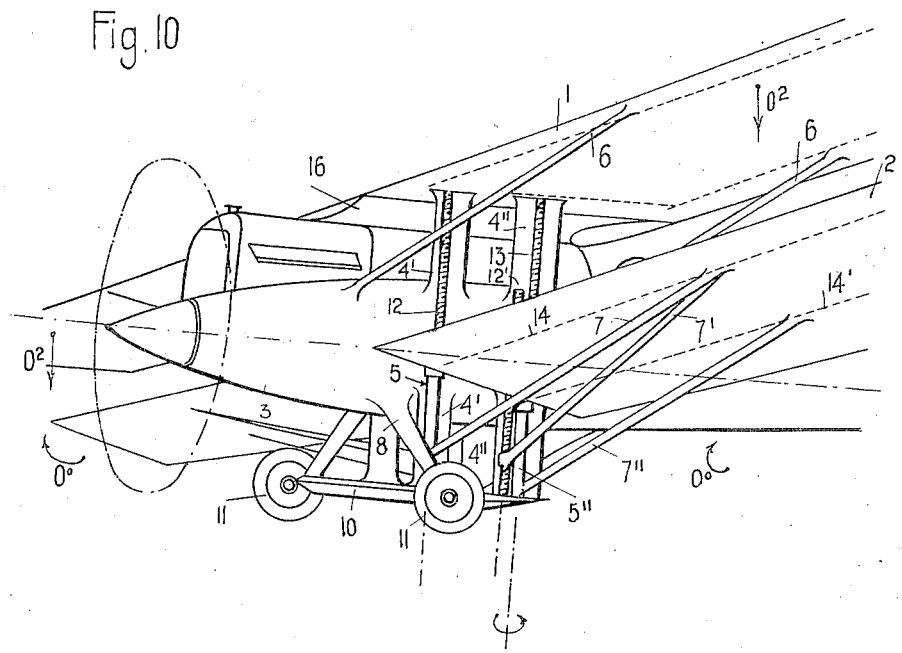

Referring now to the embodiment shown in Figs. 9 and 10, it will be seen that while the front bushing 4′ is adapted to enclose one worm 12 only, the rear bushing 4″ is of a greater section and encloses a pair of independent worms 12′ and 13.

While the worms 12 and 12′ still are associated, so that they will rotate in like directions and at equal speeds, the worm 13 may be independently rotated in either direction.

The front longéron 14 of the movable wing 2 is connected to both struts 7, 7′ of a pair of inclined struts, the former of which extends from the lower threaded collar of bar 5′, while the latter extends from a similar collar engaged on the worm 12′, said threaded collars being caused by the rotation of worms 12 and 12′ to slide vertically and conformably.

A further triangular rigid frame is provided by like members 14″, 5″ and 7″, corresponding collars at the ends of bar 5″ engaging with the rear worm 13 and being caused by the rotation thereof to slide vertically but independently from the former one.

By giving the worms 12, 12′ and 13 a synchronous and conformable rotation, obviously the mere vertical displacements of the wing 2 will be obtained, thus providing for the change of surface and curvature of the wings, like by the first embodiment.

If on the contrary the variation of incidence of movable wing 2 is also desired, it will be sufficient to stop the rotation of both associated front worms 12, 12′ at the desired extent, and to impart a further independent rotation to the rear worm 13. By so doing, the movable wing 2 will no longer be displaced vertically, parallel to the fixed wing 1, but rocking on the longéron 14 of the front rigid frame as a hinge pivot it will be inclined positively or negatively as desired, its incidence in relation to the line of flight of the machine thus being varied as required (Fig. 10).

Figure 6:
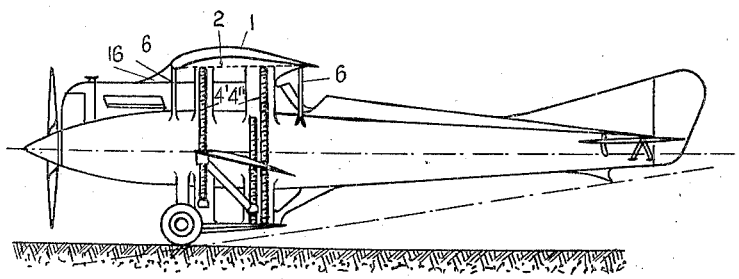
Figure 7:
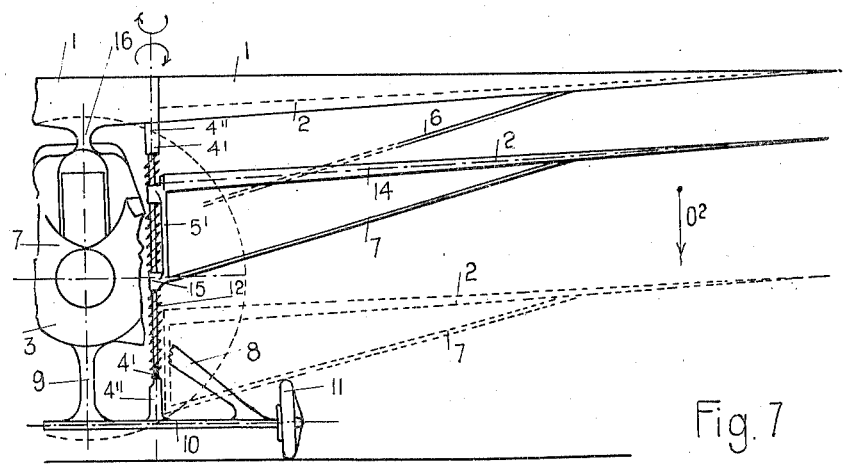
Fig. 7 is a partial front view at an enlarged scale of the aeroplane furnished with the improved devices of the invention.
Figure 8:
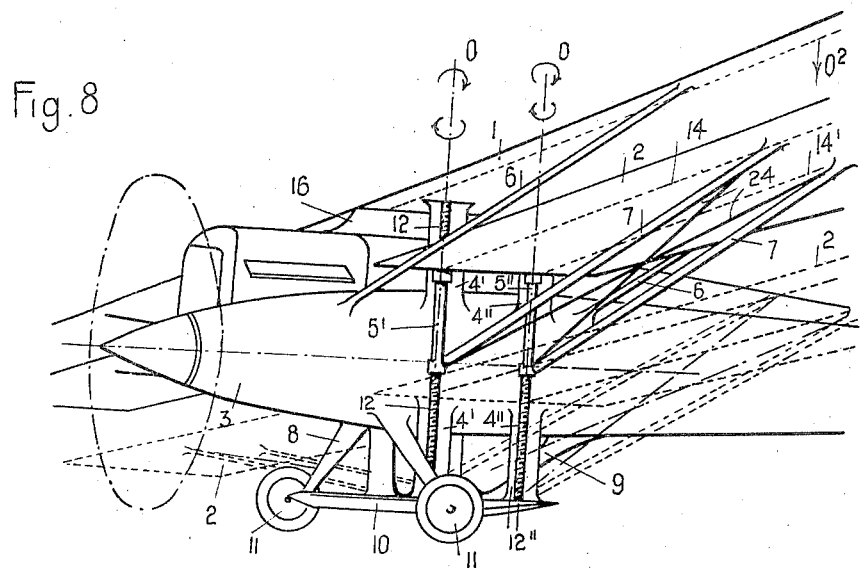
Fig. 8 is a partial perspective view thereof.

It will be noticed that for the sake of simplicity in showing, in the side views of Figs. 4, 5 and 6, and in the perspective views of Figs. 8, 9 and 10, the worms are shown as external to the bushings throughout their length, while they are obviously enclosed therein as said, and as clearly shown in Figs. 11, 12 and 13.

A further essential feature of the invention resides in the mounting of the operative connections between each worm, the corersponding hollow strut and the rigid triangular frame to which vertical displacements are to be imparted.

As shown in Figs. 11, 12 and 13, each hollow strut 4′ is preferably made of sheet metal of a substantially elliptical cross section. A longitudinal slot 19 is provided at one side thereof throughout its length. The strut is internally reinforced by means of a pair of iron bars 17′, 17″, of a trapezoidal cross section, having preferably dovetailed grooves 18 in their opposite inner faces, a bridge or arched iron 23 connecting the bars 17′, 17″ to each other (see Fig. 13). Midway the bars 17′, 17″ a worm 12 is provided, adapted to be freely and rapidly rotated, and engaging within the threaded collars or rings 15, which are provided with dovetailed side projections 20 adapted to slide along the grooves 18. The said collars are also integral with brackets 21, extending therefrom through the slot 19 to the ends of the bar 5′ of the corresponding rigid triangular frame.

As the hollow struts 4′, 4″ and the reinforcement bars 17′, 17″ thereof are fixed at their upper ends to the framework of the top stationary plane, and at their lower ends to the framework of the landing gear, or to like fixed structures; and as on the other hand the central worm 12 is elastically connected (by suitable ball bearing arrangements not shown) to the uppermost and lowermost portions of said bars 17′, 17″, while being free of rotating about its axis, the worm 12 will undergo no collapsing load on account of the displacements of the movable wing, and will be subjected to no side stress. The only and true elements subjected to some collapsing load on account of the thrust on the movable wing 2 will always and exclusively be the bars 17′, 17″, as well as the outer hollow struts 4′, 4″ reinforced thereby. On the contrary the worm 12, even during the deformation of the wing cellule, will always be subjected to tensile stresses only, like a wire rope. Furthermore, as the collars 15 are engaged by their projections 20 within the grooves 18 of bars 17′, 17″, any cross torsional stress will be transmitted to the latter, so that the central worm 12 will be subjected to no lateral stress.

While the preferable devices adapted to transform a monoplane into a biplane, or vice versa, have been described by way of example, obviously similar arrangements may be provided to change a biplane into a triplane and/or quadriplane, and vice versa, without departing from the scope of the invention.

What I claim is:

1. In aeroplanes provided with wings adapted to be varied of surface, curvature and incidence, by means of the separation of one or more detachable wings from one or more stationary upper wings, a device adapted to control the displacements of said movable wing or wings, said device comprising a rigid triangular frame including in part said movable wing or wings and adapted to vertically slide in a substantially vertical plane, and means for operating said frame in its up and down displacements.

2. In aeroplanes of the kind described having a movable wing or wings, a device adapted to control the displacements of the movable wing or wings and consisting of a rigid triangular frame including in part a movable wing, threaded collars at the ends of one side of said frame, and a rotatable worm engaging said collars.

3. In aeroplanes of the kind described having a movable wing or wings, a device adapted to control the displacements of the movable wing or wings and consisting of a rigid triangular frame, one side of said frame being formed by a longéron of the inner framework of said movable wing, while another side is vertical and formed with threaded collars at its ends, and a rotatable worm engaging said collars.

4. In aeroplanes of the kind described having a movable wing or wings, a device adapted to control the displacements of the movable wing or wings and consisting of a rigid triangular frame including in part a movable wing, threaded collars carried by one side of said frame, a rotatable worm engaging said collars and a reinforced hollow bushing surrounding said worm and acting as a guide for the displacements of said collars.

5. In aeroplanes of the kind described, comprising a movable wing, in combination, parallel spars enclosed in the framework of said wing, and a pair of devices adapted to control the displacements of said wing, each of said devices consisting of a rigid triangular frame including a wing spar and a hinged connection therewith.

6. In aeroplanes of the kind described, comprising a movable wing and a pair of devices to control the displacements thereof, each of said devices being connected to a member of the framework of said wing, in combination, means to impart a parallel displacement to said devices, and a similar further device adapted to impart an independent displacement to another member of the framework of said wing.

7. In aeroplanes of the kind described, comprising a movable wing, a framework in said wing formed with a pair of parallel spars, a rigid triangular frame hingedly connected to one of said spars and adapted to slide vertically, a second substantially triangular frame connected to said one spar and adapted to slide conformably with said former triangular frame, and a further triangular frame hingedly connected to the second of said parallel spars and adapted to slide vertically but independently from said former frames.

8. In aeroplanes of the kind described, comprising a movable wing and means to impart displacements thereto, a worm, a sheet metal slotted bushing of substantially elliptical cross section surrounding said worm, longitudinally dovetail grooved bars reinforcing said bushing internally thereof, threaded collars engaging said worm and operatively connected to said movable wing, and dovetailed projections on said collars, said projections engaging the grooves in said reinforcement bars and being adapted to slide longitudinally therein.

In testimony whereof, I set my hand.

ALDO TAMMEO.